US006552852B2

(12) United States Patent
Hill

(10) Patent No.: US 6,552,852 B2
(45) Date of Patent: Apr. 22, 2003

(54) CATOPTRIC AND CATADIOPTRIC IMAGING SYSTEMS

(75) Inventor: Henry A. Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 0 days.

(21) Appl. No.: 10/028,508

(22) Filed: Dec. 20, 2001

(65) Prior Publication Data

US 2002/0131179 A1 Sep. 19, 2002

Related U.S. Application Data

(60) Provisional application No. 60/257,833, filed on Dec. 21, 2000.

(51) Int. Cl.[7] .......................... G02B 27/10; G02B 3/00; G02B 17/00; H01J 5/16
(52) U.S. Cl. ....................... 359/618; 359/629; 359/664; 359/708; 359/726; 359/727; 250/216
(58) Field of Search ............................... 359/618, 629, 359/664, 708, 726, 727, 729, 730, 731, 637, 638, 663, 366, 859; 349/65; 250/216

(56) References Cited

U.S. PATENT DOCUMENTS

| 3,628,027 A | * 12/1971 | Brauss ........................ 250/216 |
| 3,748,015 A | 7/1973 | Offner .......................... 359/366 |
| 4,011,001 A | 3/1977 | Hemstreet et al. ............ 349/65 |
| 4,226,501 A | 10/1980 | Shafer ......................... 359/859 |
| 5,241,423 A | * 8/1993 | Chiu et al. .................. 359/727 |

* cited by examiner

Primary Examiner—Loha Ben
(74) Attorney, Agent, or Firm—Fish & Richardson P.C.

(57) ABSTRACT

The invention features an imaging system for imaging an object point to an image point. The system includes: a beam splitter positioned to receive light rays from the object point and separate each ray into a transmitted portion and a reflected portion, the transmitted portions defining a first set of rays and the reflected portions defining a second set of rays; and a reflecting surface positioned to receive one of the sets of rays from the beam splitter and focus that set of rays towards the image point via the beam splitter. Interferometric techniques may be applied to increase the light throughput of the system.

22 Claims, 9 Drawing Sheets

CATOPTRIC AND CATADIOPTRIC IMAGING SYSTEMS

CROSS-REFERENCE TO RELATED APPLICATIONS

This application claims priority to U.S. provisional application No. 60/257,833 by Henry A. Hill and filed Dec. 21, 2000, the contents of the provisional application are incorporated herein by reference.

BACKGROUND

This invention relates to optics, and more particularly to catoptric imaging systems.

Imaging systems of varying sorts have existed for thousands of years. Even after such a long period of development, modern imaging systems still have a similar purpose as their ancient counterparts. Imaging systems gather light from an object point and its vicinity and focus this light into an image at an image point and its vicinity. Light can be focused using refraction and this branch of optics is known as dioptrics. Light can also be focused using reflection and this branch of optics is known as catoptrics. Irregardless of the focusing system used typical imaging systems strive to optimize a few important parameters. For example, many imaging systems are designed to optimize resolution, numerical aperture, and shape of the image plane. Resolution of the imaging system is the smallest distance between features in the object space that can be distinguished in the image plane. Therefore resolution determines the level of detail that can be derived from the image. Numerical aperture relates to the amount of available light that the imaging system collects from the object. For most types of detectors, such as photographic film, charge coupled devices, or even the human eye, a larger numerical aperture increases light intensity and typically yields better images. Lastly, the shape of the image plane can be quite important. A flat plane is typically most useful for detection devices like photographic film or charged coupled devices (CCD). Unfortunately, all of these parameters can be degraded by a host of aberrations.

SUMMARY

The present invention features catoptric optical systems that utilize a beam splitter surface and a reflecting surface. Primary focusing can be achieved with the reflecting surface and therefore longitudinal chromatic aberrations are reduced. The beam splitter is positioned relative to the object point, image point, and the reflective surface such that light rays from the object point which are focused to the image point have been both reflected and transmitted by the beam splitter surface. The combination of a reflection and a transmission for each ray of the beams being focused substantially eliminates first-order variations in the beam intensity due to imperfections in the reflective and transmissive properties of the beam splitter for incident angles deviating from a central design angle. In some embodiments of the system, light transmission may be enhanced by use of interferometric recombination of light reflected and transmitted by the beam splitter. Furthermore, some embodiments of the system may include refractive elements to reduce aberrations.

In general, in one aspect, the invention features an imaging system for imaging an object point to an image point. The system includes i) a beam splitter positioned to receive light rays from the object point and separate each ray into a transmitted portion and a reflected portion, the transmitted portions defining a first set of rays and the reflected portions defining a second set of rays; and ii) a reflecting surface positioned to receive one of the sets of rays from the beam splitter and focus that set of rays towards the image point via the beam splitter.

Embodiments of the imaging system may include any of the following features.

The reflecting surface may be positioned to receive the first set of rays and reflect the first set of rays back to the beam splitter, in which case the beam splitter is positioned to reflect at least a portion of each ray received from the reflecting surface to the image point. Furthermore, the reflecting surface may be substantially concentric with the object point. A center of the reflecting surface may define an object optical axis with the object point, and the beam splitter may be positioned substantially perpendicular to the object optical axis or at an acute angle to the object optical axis (e.g., an acute angle substantially equal to 45 degrees).

Alternatively, the reflecting surface may be positioned to receive the second set of rays and reflect the second set of rays back to the beam splitter, in which case the beam splitter is positioned to transmit at least a portion of each ray received from the reflecting surface to the image point. Furthermore, the reflecting surface may be substantially concentric with the image point. A center of the reflecting surface may define an image optical axis with the image point, and the beam splitter may be positioned substantially perpendicular to the image optical axis or at an acute angle to the image optical axis (e.g., an acute angle substantially equal to 45 degrees).

The imaging system may further include a first optic having an internal surface defining the reflecting surface. For example, the internal surface of the first optic may be curved. The first optic may have a flat surface opposite the internal surface, and the beam splitter may be positioned adjacent the flat surface. Furthermore, the system may include a plano-convex optic having a piano surface adjacent one of the object point and the image point and a convex surface contacting the first optic, wherein the interface between the plano-convex optic and the first optic defines a refracting surface.

More generally, the imaging system may include a refracting surface positioned between the object point and the beam splitter to receive the light rays from the object point. For example, the refracting surface may be substantially concentric with the object point. Alternatively, or in addition, the system may include a refracting surface positioned between the beam splitter and the image point to receive the light rays focused by the reflecting surface. For example, the refracting surface may substantially concentric with the image point.

The system may also include a second optic adjacent the first optic, wherein the beam splitter is positioned at an interface between the first and second reflective optics. Furthermore, the system may include a plano-convex optic having a piano surface adjacent one of the object point and the image point and a convex surface contacting the second optic, wherein the interface between the plano-convex optic and the second optic defines a refracting surface. Moreover, the system may further include another plano-convex optic having a piano surface adjacent the other of the object point and the image point and a convex surface contacting the first optic, wherein the interface between the plano-convex optic and the first optic defines another refracting surface.

The second optic may be an optical flat. Alternatively, the second optic may have an internal surface defining a second reflecting surface, and wherein the first reflecting surface is positioned to receive the first set of rays and the second reflecting surface is positioned to received the second set of rays and focus them towards the image point via the beam splitter. Furthermore, the beam splitter may be positioned to interferometrically recombine the first set of rays received from the first reflecting surface and the second set of rays received from the second reflecting surface. The first reflecting surface may be concentric with the object point and the second reflecting surface may be concentric with the image point.

In general, in another aspect, the invention features an imaging system including a first imaging subsystem for imaging an object point to a first image point; and a second imaging subsystem for imaging the first image point to a second image point. The first imaging subsystem second includes i) a first beam splitter positioned to receive light rays from the object point and separate each ray into a transmitted portion and a reflected portion, wherein the transmitted portions define a first set of rays and the reflected portions defining a second set of rays; and ii) a first reflecting surface positioned to receive one of the sets of rays from the first beam splitter and focus that set of rays towards the first image point via the first beam splitter. The second imaging subsystem includes (i) a second beam splitter positioned to receive light rays from the first image point and separate each ray into a transmitted portion and a reflected portion, wherein the transmitted portions define a first set of rays and the reflected portions defining a second set of rays; and (ii) a second reflecting surface positioned to receive one of the sets of rays from the second beam splitter and focus that set of rays towards the second image point via the second beam splitter.

In general, in another aspect, the invention features an imaging method for imaging an object point to an image point. The method including: receiving light rays from the object point and separating each ray into a transmitted portion and a reflected portion, the transmitted portions defining a first set of rays and the reflected portions defining a second set of rays; and receiving one of the sets of rays from the beam splitter and reflecting that set of rays to focus them towards the image point via the beam splitter.

Embodiments of the inventions may include any of the following advantages.

They may have a large numerical aperture in the object space. They may have substantially no longitudinal chromatic aberrations. They may have an image plane whose location is substantially independent of the spectral region used in image formation. They may use a large spectral range for image formation. They may have a flat image plane. They may have a reduced set of optical aberrations. They may have a magnification which is less than, greater than, or equal to one.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
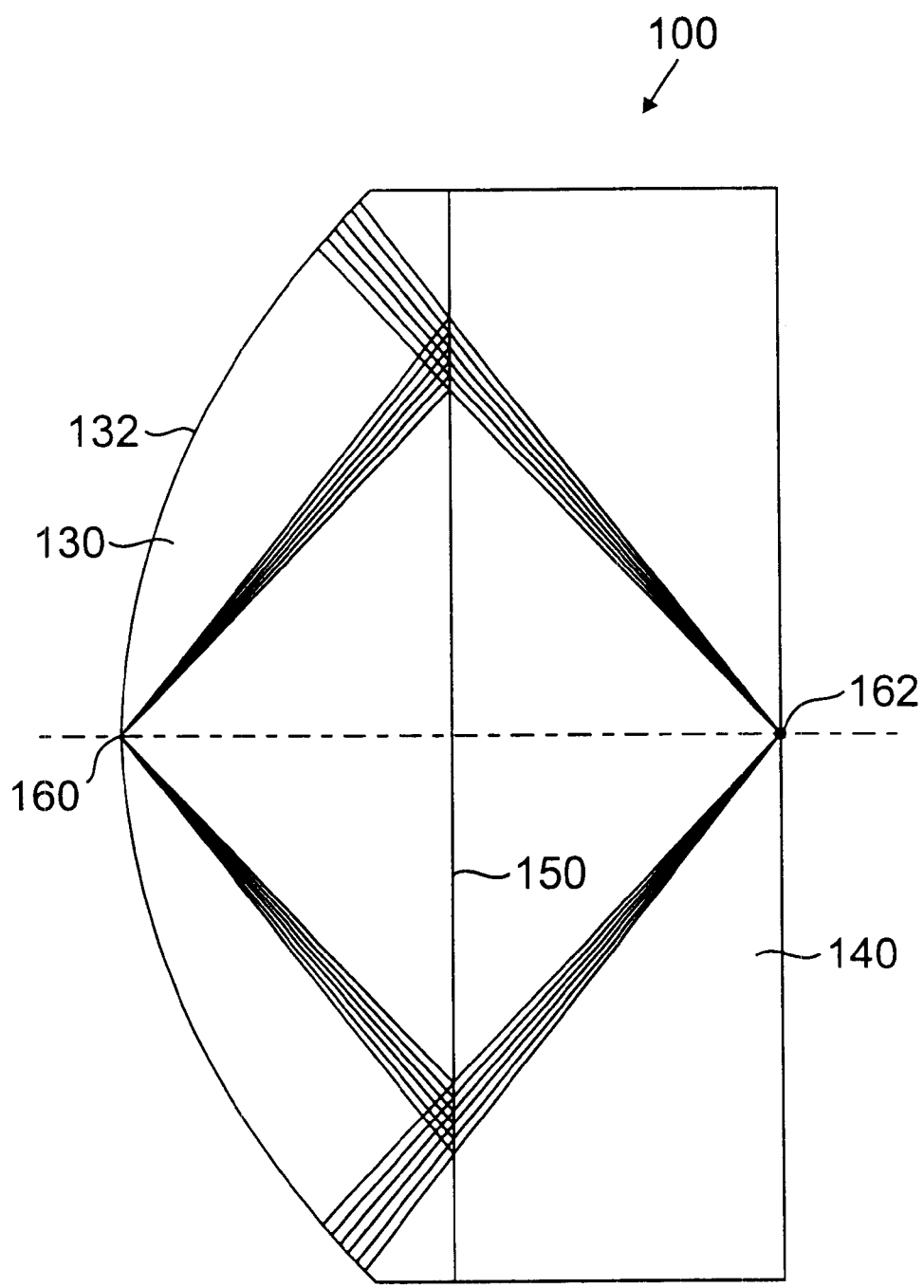
FIG. 1 is a schematic drawing of a catoptric imaging system including a reflective surface and a beam splitter.

Referring to FIG. 1, a catoptric imaging system 100 includes an object point 160, an image point 162, a beam splitter 150, a curved reflective surface 132, and light transmitting elements 130 and 140. Light emanating from the object point 160 passes through the light transmitting element 130 and is incident on the beam splitter 150. The beam splitter 150 reflects and transmits portions of the incident light beams. In the presently described embodiment, the portion of light that is initially transmitted is ignored and it is omitted from FIG. 1. The reflected portion is shown in FIG. 1 and is incident onto the reflective surface 132. The surface 132 is constructed such that each light ray emanating from the object point 160 that is reflected from the beam splitter 150 and incident onto the surface 132 is reflected to the image point 162 after being transmitted by the beam splitter 150. In other words, light emanating from the object point 160 is focused onto the image point 162 by the following path: i) light is emanated from the object point 160; ii) reflected by beam splitter 150; iii) reflected by reflective surface 132; iv) transmitted by the beam splitter 150; and v) converges onto the image point 162.

Because reflecting surface 132 causes the focusing of the rays to the image point, and not refraction by media 130 and 140, the image plane is independent of the spectral region used in image formation (provided that media 130 and 140 do not substantially differ in index). In other words, there is no longitudinal chromatic aberration. Accordingly, a large spectral range can be used for image formation.

The index of refraction of medium 130 impacts the numerical aperture of the system. In particular, the numerical aperture of system 100 scales linearly with the index of refraction of the medium 130. Although by no means limiting, the rest of this discussion assumes that the indices of refraction for elements 130 and 140 (and their analogs in other embodiments) are substantially the same.

In one embodiment, the features of system 100 are achieved with the following design. Given the object point 160 and the image point 162, beam splitter 150 is positioned to lie in the plane defined by points that are equidistant from the object and image points. Furthermore, reflective surface 132 is designed to be concentric with the image point 162.

As a result of this construction, a light ray emanating from the object point at an angle φ is incident on the beam splitter at some point P with an angle of incidence of φ. By design light is incident onto surface 132 at a normal angle of incidence and therefore such light rays are reflected through 180 degrees. Furthermore, after reflection from surface 132, the light is incident on the beam splitter at the same point P with angle of incidence of φ and after transmission by the beam splitter 150 the light ray is incident on the image point with angle of incidence of φ.

As described above, the light incident on the image point is both reflected and transmitted by the beam splitter surface. Therefore, the light reaching image point 162 is proportional to $R(\phi)T(\phi)$, where R and T are the reflection and transmission coefficients of beam splitter 150, respectively. Both of these coefficients are typically dependent on the angle of incidence. Using techniques known in the art, beam splitter 150 is designed such that for some angle φ' beam splitter 150 is ideal. That is, for some angle φ', $R(\phi') \cong T(\phi') \approx 0.5$. As the angle of incidence differs from φ', the coefficients will often demonstrate nonideal beam splitter behavior. Specifically, the behavior deviates from the ideal by some $\delta(\phi)$, and $R(\phi)=0.5+\delta(\phi-\phi')$ and $T(\phi)=1-R(\phi)=0.5-\delta(\phi-\phi')$ where $\delta(0)=0$. Because the light rays incident on image point 162 as shown in FIG. 1 are both reflected and transmitted, then $T(\phi)R(\phi)=0.25-\delta(\phi-\phi')^2$. Thus even though the beam splitter may deviate from an ideal beam splitter with some deviation $\delta(\phi)$ the nonideal behavior will only impact the light intensity to second order in $\delta(\phi)$.

Furthermore, this embodiment has an object point image that is diffraction limited. Although other points in the object plane may not be diffraction limited, there does exist a planar disc centered on the object point and parallel with the beam splitter 150 whose image is also a flat disc of the same radius. In other words, the image plane is flat and the magnification is 1.

Element 130 and surface 132 may be made in a number of ways. Transmitting element 130 and the reflecting surface 132 may be made from a solid light-transmitting medium (e.g. fused silica). In this case, the solid light-transmitting medium can be shaped to have one side that is to match the shape of the beam splitter 150 and another side whose shape matches the desired shape for reflecting surface 132. By suitably depositing a reflecting film onto the curved surface, the reflecting surface 132 is formed. This could be accomplished using any of the well-known techniques in the art for forming reflecting films. The reflecting film is not applied within some neighborhood of the object point 160 (not shown). Instead the surface near the object point would be constructed to allow light rays to enter into the imaging system. For example, an antireflection coating may be applied to surface 132 in the vicinity of object point 160. Such an aperture allows light rays from the object point to enter into the imaging system.

In another embodiment, light-transmitting element 130 may be a hollow region of vacuum or filled with a light transmitting gas or fluid. In such embodiments, the reflective surface 132 may be formed onto some mechanically supporting substrate (not shown) and its external surface is either intrinsically reflective (e.g. a polished metal surface) or is made reflective by application of a reflective film. Furthermore, an aperture is formed in the vicinity of the object point 160 such that light can enter the imaging system (not shown).

In other embodiments, the reflecting surface 132 may be a non-smooth and/or discontinuous surface. For example, the reflecting surface may be formed by an array of flat reflecting surfaces positioned to be substantially concentric with the image point 162 so as to provide the same optical function as the surface 132 in FIG. 1. Furthermore reflecting surface 132 may have deviations from a concentric shape (e.g. elliptical or parabolic). Such deviations may be useful in correcting for higher order aberrations.

In preferred embodiments of system 100, element 130 is a high-index material and element 130 and beam splitter 150 are positioned such that element 130 contacts object point 160 to thereby maximize the numerical aperture of the imaging system. This is a non-limiting case, however, and in other embodiments the object point need not contact element 130. Similarly, element 140 need not contact image point 162. Moreover, in subsequently described embodiments, the object point and/or the image point need not contact an element of the imaging system, although, depending on the embodiment, this may be preferable to maximize numerical aperture.

Although not intended to limit the invention in any way, as a theoretical curiosity it is noteworthy to point out that imaging system 100 functions equivalently to a pair of planar elements each having opposite indices of refraction (i.e., one element having a positive index +n, and the other element having a negative index −n). In particular, refraction at the interface between two such elements causes light rays emitted from the object point to bend and focus to the image point. This can be seen from a trivial application of Snell's law of refraction. Such bending and focusing is effectively achieved in system 100 by the initial reflection from beam splitter 150 and the subsequent reflection by reflecting surface 132. A similar effect is also present in the subsequently described embodiments.

Figure 2:
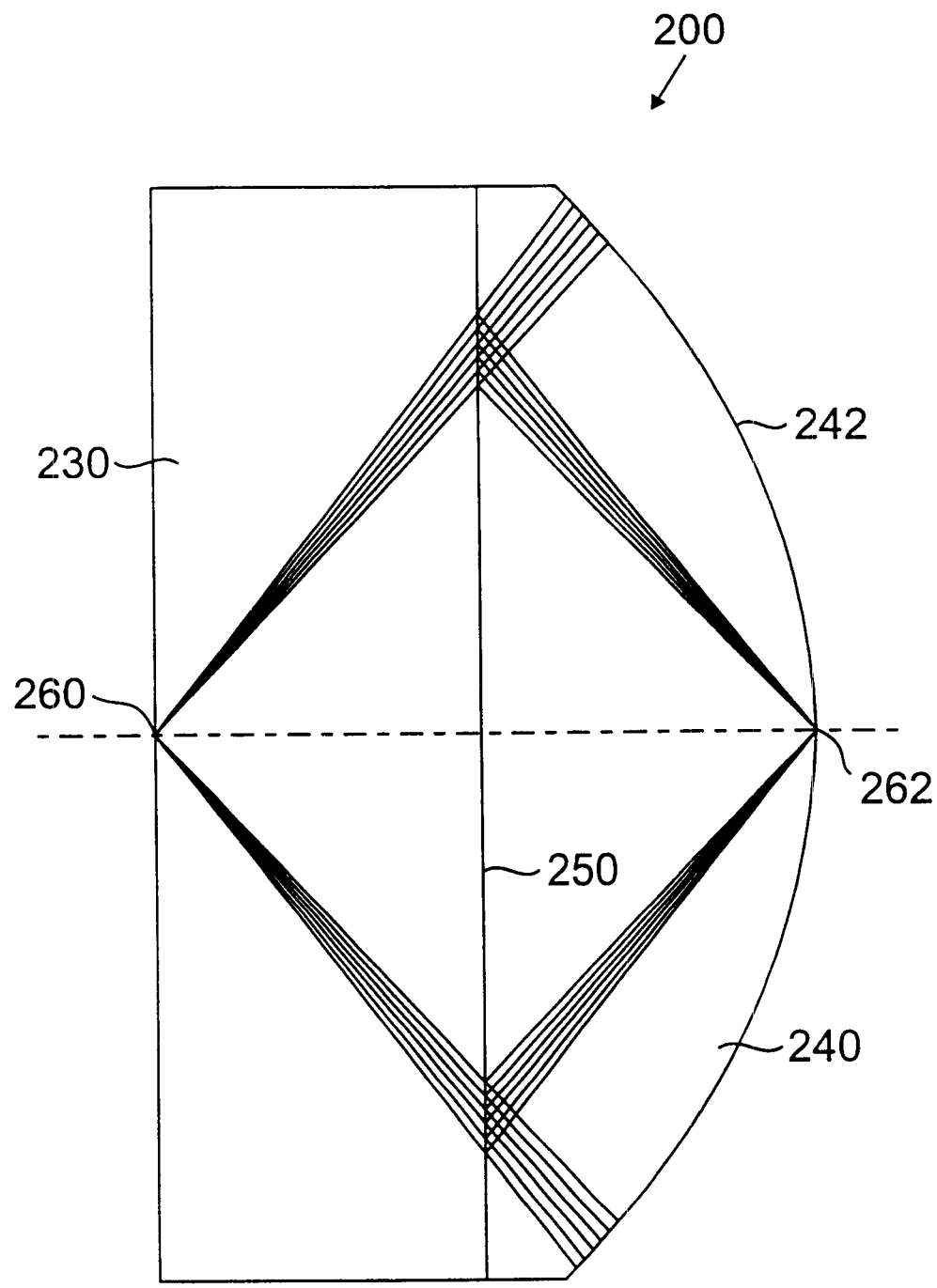
FIG. 2 is a schematic drawing of another catoptric imaging system including a reflective surface and a beam splitter.

From the design of imaging system 100, it is clear that light that initially is transmitted by the beam splitter is ignored and only the reflected component is used. Other imaging systems can be designed such that the initially transmitted component is utilized and the reflected component is discarded. Referring to FIG. 2, a catoptric imaging system 200 includes an object point 260, an image point 262, a beam splitter 250, a curved reflective surface 242, and light transmitting media 230 and 240. The embodiment of FIG. 2 is similar to that of FIG. 1 except that in the embodiment of FIG. 2, reflecting surface 242 is positioned to receive light transmitted by the beam splitter surface, whereas the reflecting surface in FIG. 1 is positioned to receive light reflected by the beam splitter surface. In a preferred embodiment of system 200, the reflecting surface 242 is concentric with object point 260. As is the case with the embodiment in FIG. 1, the intensity of incident light imaged to image point 262 is proportional to $T(\phi)R(\phi)=0.25-\delta(\phi-\phi')^2$. Thus the image point light intensity has no first order deviations due to non-ideal beam splitter behavior. Furthermore, as described with reference to FIG. 1 a transparent window or an aperture in surface 242 allows access to the image point 262 for light emanating from object point 260.

Figure 3:
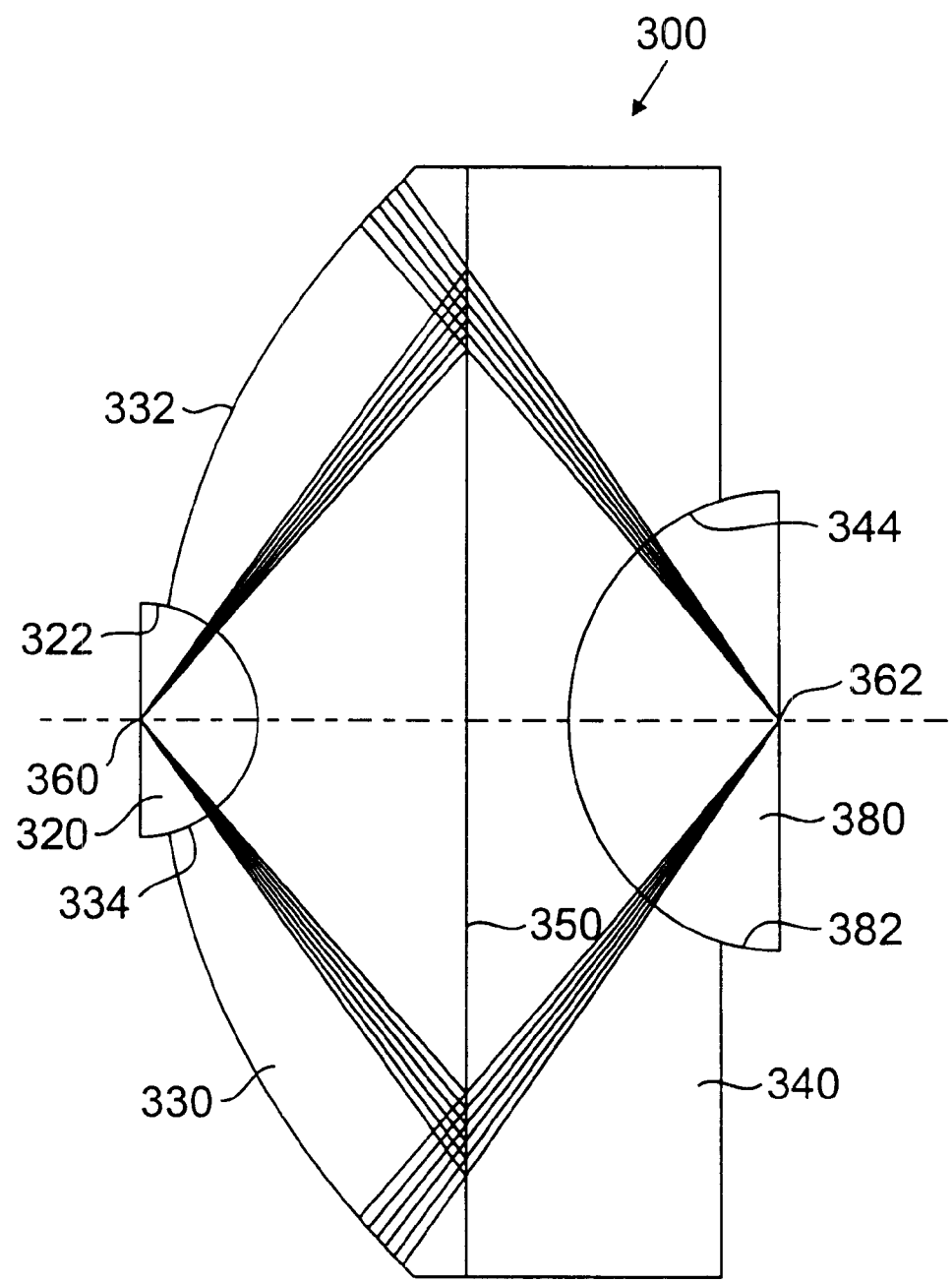
FIG. 3 is a schematic drawing of a catadioptric imaging system including a reflective surface, a beam splitter, and two refractive surfaces.

In the embodiments of FIGS. 1 and 2, although the object point is diffraction limited, the points in the vicinity of the object point may not be. Such points may suffer from certain optical aberrations. Such aberrations may be corrected for a large part of the object plane by introducing refractive surfaces. Referring to FIG. 3, a catadioptric imaging system 300 includes an object point 360, an image point 362, a beam splitter 350, a curved reflective surface 332, a plano-concave-convex element 330, a plano-concave element 340, and plano-convex elements 320 and 380. The common center of curvature for surface 322 of element 320 is the object point 360. The common center of curvature for surface 344, surface 332 of element 330, and surface 382 of element 380 is image point 362. Element 320 and element 330 are formed such that the radius of curvature of surface 322 of element 320 is substantially the same as the radius of curvature of surface 334 of element 330. Element 340 and element 380 are formed such that the radius of curvature of surface 344 of element 340 is substantially the same as the radius of curvature of surface 382 of element 380. Surfaces 322 and 344 are preferably coated with an antireflection coating.

The refracting surfaces in system 300 provide additional degrees of freedom that can be used to reduce optical aberrations in the image field. In particular, any of the index of refraction of elements 320, 380, 340 and the radius of curvature of surface elements 334, 344, 332 may be varied to reduce such aberrations. For example, optical ray tracing methods may be used to calculate the amplitude of the various aberrations as functions of such variables and in this way particular values of the parameters can be found that minimize the aberrations. Such optimizations may also take into account other design criteria such as magnification, planarity of the image field, numerical aperture, optical absorption and other material limitations. Notably, for example, the numerical aperture of system 300 scales with the index of refraction of the element 320. Thus, by use of a high index material, the numerical aperture can be improved. Moreover, an optimization may fix the indices of refraction for elements 320, 330, 340, and 380 simply because specific materials are to be used for these elements.

In some embodiments, element 380 or element 320 may be excluded. Elements 380 or 320 may be replaced by a void to be filled with a gas, liquid or vacuum. In some embodiments only one refractive surface may be used. In such cases, the index of refraction of element 380 or 320 matches the index of elements 330 and 340 such that interface 322/334 or 344/382 is no longer a refractive surface. Use of a void provides access to the image point or object point. Such access may be useful, for example, to position a detector near the image point.

Figure 4:
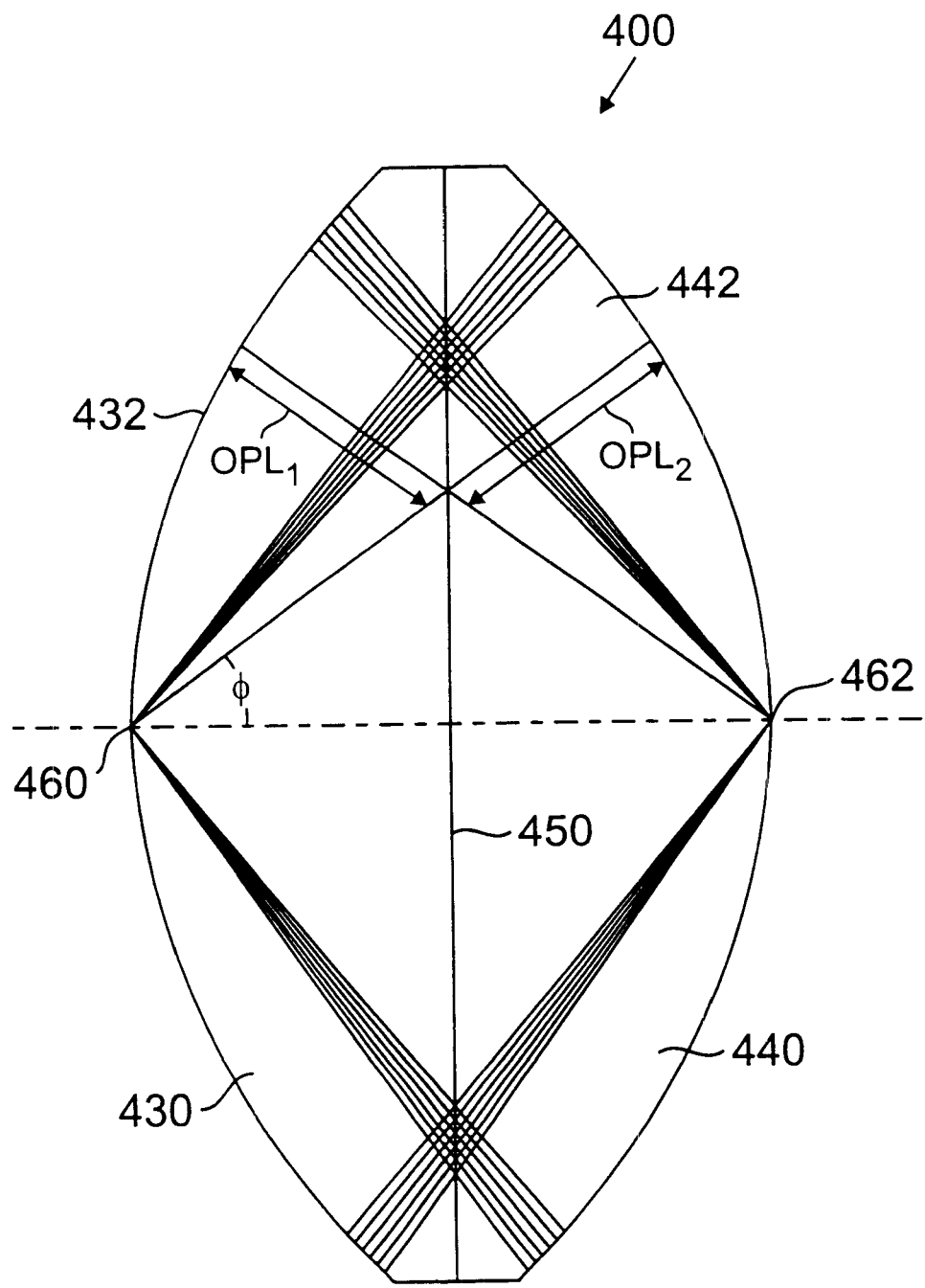
FIG. 4 is a schematic drawing of a catoptric imaging system including two reflecting surfaces constructed and positioned such that interferometric effects lead to increased light intensity at the image point.

As described above, the light intensity at the image point for imaging system 100, 200, and 300 are proportional to $T(\phi)R(\phi)=0.25-\delta^2$. Even in the ideal case, where $\delta=0$, only 25% of the available light reaches the image point. Referring to FIG. 4, a catoptric imaging system 400 includes an object point 460, an image point 462, a beam splitter 450, a curved reflective surface 432, a curved reflective surface 442 and plano-convex elements 430 and 440. The reflective surface 442 is constructed such that light rays emanating from the object point 460 are focused to the image point 462 by following the path: i) the light emanates from the object point; ii) is transmitted by the beam splitter 450; iii) is reflected by surface 432; iv) is reflected by the beam splitter 450; v) is incident onto the image point 462. In the preferred embodiment this is accomplished by designing curved surface 442 to be concentric with the object point 460. Similarly the reflective surface 432 is constructed such that light rays emanating from the object point are focused to image point 462 by following the path: i) the light emanates from the object point; ii) is reflected by the beam splitter 450; iii) is reflected by surface 432; iv) is transmitted by beam splitter 450; and v) is incident onto the image point 462. In the preferred embodiment this is accomplished by designing curved surface 432 to be concentric with the image point 462.

In the embodiment described for FIG. 4, both the initially reflected and initially transmitted beams from the beam splitter are used. A beam is split by beam splitter 450 into two portions that are then reflected by surfaces 432 and 442, respectively, back to the same point on the beam splitter. Generally, the two portions recombine interferometrically to produce two new beams. One beam is directed to the image point 462 and the other is directed to the object point 460. The intensities of the respective beams depend on the difference in optical path length for the beam portions reflected from surfaces 432 and 442. FIG. 4 labels the two optical paths for the portions as OPL1 and OPL2. In preferred embodiments, the optical path lengths for the portions corresponding to each ray are matched such that the two beams interfere constructively to direct all of the optical energy to the image point. Thus, the concentric curved surfaces 442 and 432 are positioned and shaped to agree to within a small fraction of a wavelength. Nonetheless, even where the optical path lengths are not exactly matched for all rays, the transmission to the image point can be enhanced relative to the earlier embodiments where transmission is limited to 25%.

The matched concentric curved surfaces 442 and 432 may be constructed using known techniques for fabricating precision surfaces. For example, a master set of reflecting surfaces 432 and 442 are constructed using high precision techniques for grinding spherical surfaces in conjunction with high precision metrology techniques. From the master set, replication techniques are employed to mass-produce copies of the surfaces. Such methods are commonly used to produce diffraction gratings. Furthermore, if there is some uncertainty in the resulting structures, testing can be used to retain only those copies that enhance transmission. Such testing may include the light transmission properties and surface profile measurements.

Figure 5:
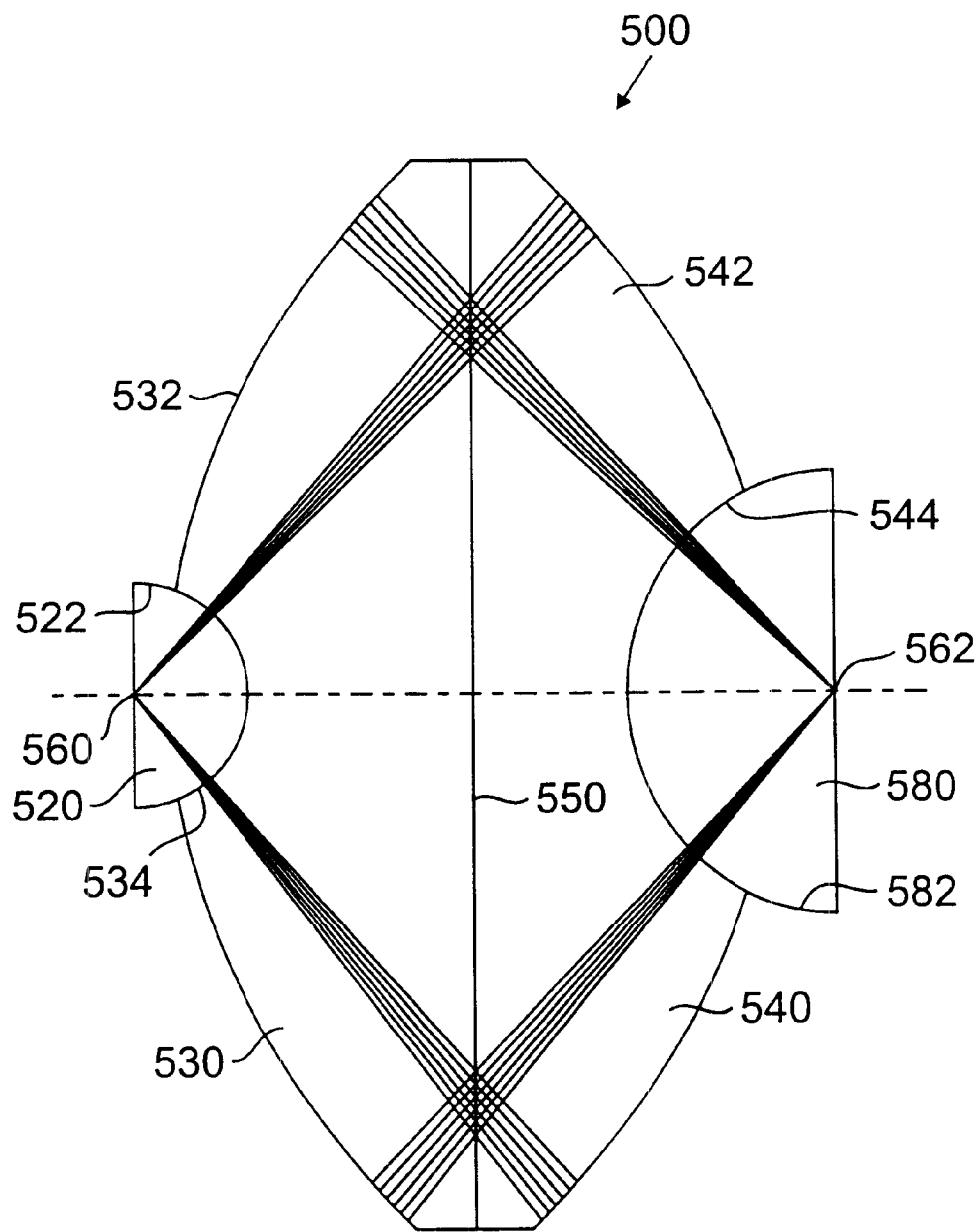
FIG. 5 is a schematic drawing of a catadioptric imaging system similar to the imaging system in FIG. 4 including refractive surfaces that reduce optical aberrations.

Similar to the discussion of imaging system 300, the object point of imaging system 400 is diffraction limited, but points in the vicinity of the object point may be distorted by aberrations. By the use of refractive surfaces it is possible to make these aberrations substantially zero for points in the object plane displaced from the object point. Referring to FIG. 5, an catadioptric imaging system 500 includes an object point 560, an image point 562, a beam splitter 550, a curved reflective surface 532 and 542, plano-concave-convex light transmitting elements 530 and 540, and plano-convex elements 520 and 580. Element 520 and element 530 are formed such that the radius of curvature of surface 522 of element 520 is substantially the same as the radius of curvature of surface 534 of element 530. Element 540 and element 580 are formed such that the radius of curvature of surface 544 of element 540 is substantially the same as the radius of curvature of surface 582 of element 580. In the preferred embodiment, the common center of curvature for surface 522 of element 520, for surface 534 of element 530, and for surface 542 of element 540 is the object point 560. Furthermore in the preferred embodiment the common center of curvature for surface 544 of element 540, for surface 532 of element 530, and for surface 582 of element 580 is the image point 562. Surfaces 522 and 544 are preferably coated with an antireflection coating. Furthermore, similar to the imaging system 400 of FIG. 4, the surfaces 542 and 532 are constructed such that light rays which are split by the beam splitter 550 recombine at a common point on beam splitter 550 and interfere constructively to enhance the light transmission to the image point 562.

In some embodiments, element 580 is composed of air. This allows for optical detection devices like CCD's to be positioned easily near the image point. The radii of curvature $r_{522}$, $r_{534}$, and $r_{544}$ of the refractive surfaces 522, 534, and 544, respectively, are chosen to minimize certain optical aberrations. Non-limiting examples of radii of curvature are shown in Table 1 for several different combinations of refractive materials with $r_{532}=r_{542}=50$ m where $r_{532}$ and $r_{542}$ are the radii of curvature of surfaces 532 and 542, respectively. It is assumed that element 580 is air. Results of geometrical ray traces through systems employing the combination of refractive materials listed in Table 1 show that the images formed by the first embodiment are diffraction limited for an object field of 0.5 mm with an object space numerical aperture equal to 0.77 times the index of refraction of element 520.

TABLE 1

| Lens 520 | Element 530, 540 | $n_{520}$ (633 nm) | $n_{530}, n_{540}$ (633 nm) | $r_{522}, r_{534}$ (mm) | $r_{544}$ (mm) |
|---|---|---|---|---|---|
| GaP[a] | Fused Silica | 3.3079 | 1.4570 | 8.467 | 17.500 |
| BSO[b] | Fused Silica | 2.5500 | 1.4570 | 5.551 | 12.270 |
| YSZ[c] | Fused Silica | 2.1517 | 1.4570 | 3.000 | 6.720 |
| YAG[d] | Fused Silica | 1.8328 | 1.4570 | 2.997 | 16.030 |

[a]GaP: Gallium phosphide
[b]BSO: Bismuth silicon oxide, $Bi_{12}SiO_{20}$
[c]YSZ: Ytterbium stabilized zirconia, $ZrO_2$: 12% $Y_2O_3$
[d]YAG: Yttrium aluminum garnet, $Y_3Al_5O_{12}$ where $n_{520}$, $n_{530}$, and $n_{540}$ are the refractive indices of elements 520, 530, and 540, respectively.

Figure 6:
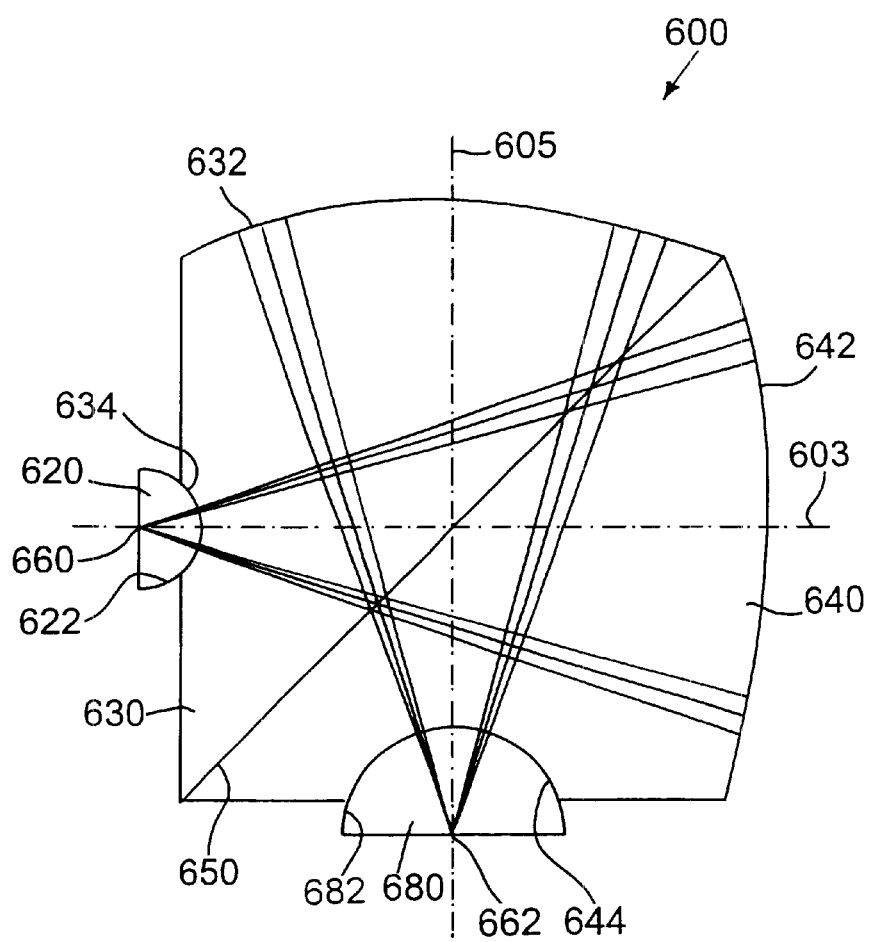
FIG. 6 is a schematic drawing of a catadioptric imaging system similar to the imaging system in FIG. 5 except that the optical axes are not coextensive.

Referring to FIG. 6, a catadioptric imaging system 600 includes an object point 660, an image point 662, a beam splitter 650, a curved reflective surface 632 and 642, plano-concave-convex light transmitting elements 630 and 640, and plano-convex elements 620 and 680, and optical axes 603 and 605. Optical axis 603 is the axis between the object point 660 and the center of spherical surface 642. Optical axis 605 is the axis between the image point 662 and the center of the curved reflective surface 632. This embodiment is analogous to the embodiment of imaging system 500. The main difference is that the corresponding optical axes in FIG. 5 (not shown) are coextensive. For imaging system 600, the optical axes intersect at some nonzero angle. (FIG. 6 is shown with optical axes nearly orthogonal but this is not a limiting example; other angles of intersection are possible). Other than the non-zero angle between the axes, the description of this embodiment is identical to the description of imaging system 500 except with 100 added to each elemental number in the description. Although imaging system 600 is described in analogy with imaging system 500, the non coextensive optical axes of imaging system 600 can also be applied in analogous fashion to imaging systems 100, 200, 300, and 400.

The imaging system 600 does have object planes and image planes which are no longer parallel. They are at the same angle as the angle between the optical axes 603 and 605. In some embodiments this may be an advantage. Furthermore, the angle of incidence of the central ray (a ray coincident with the optical axes) is no longer 90 degrees (as in systems 100–500). As shown in FIG. 6, the angle of incidence of the central ray is about 45 degrees. As discussed above, the angle of incidence to the beam splitter influences the performance of the beam splitter. Therefore, the angle between the optical axes also influences overall imaging system performance and as such the angle between the optical axes is a design choice which impacts the design and optimization of the beam splitter. Furthermore, in imaging system 600 the central ray is not obscured by refractive elements 620 or 680.

Figure 7:
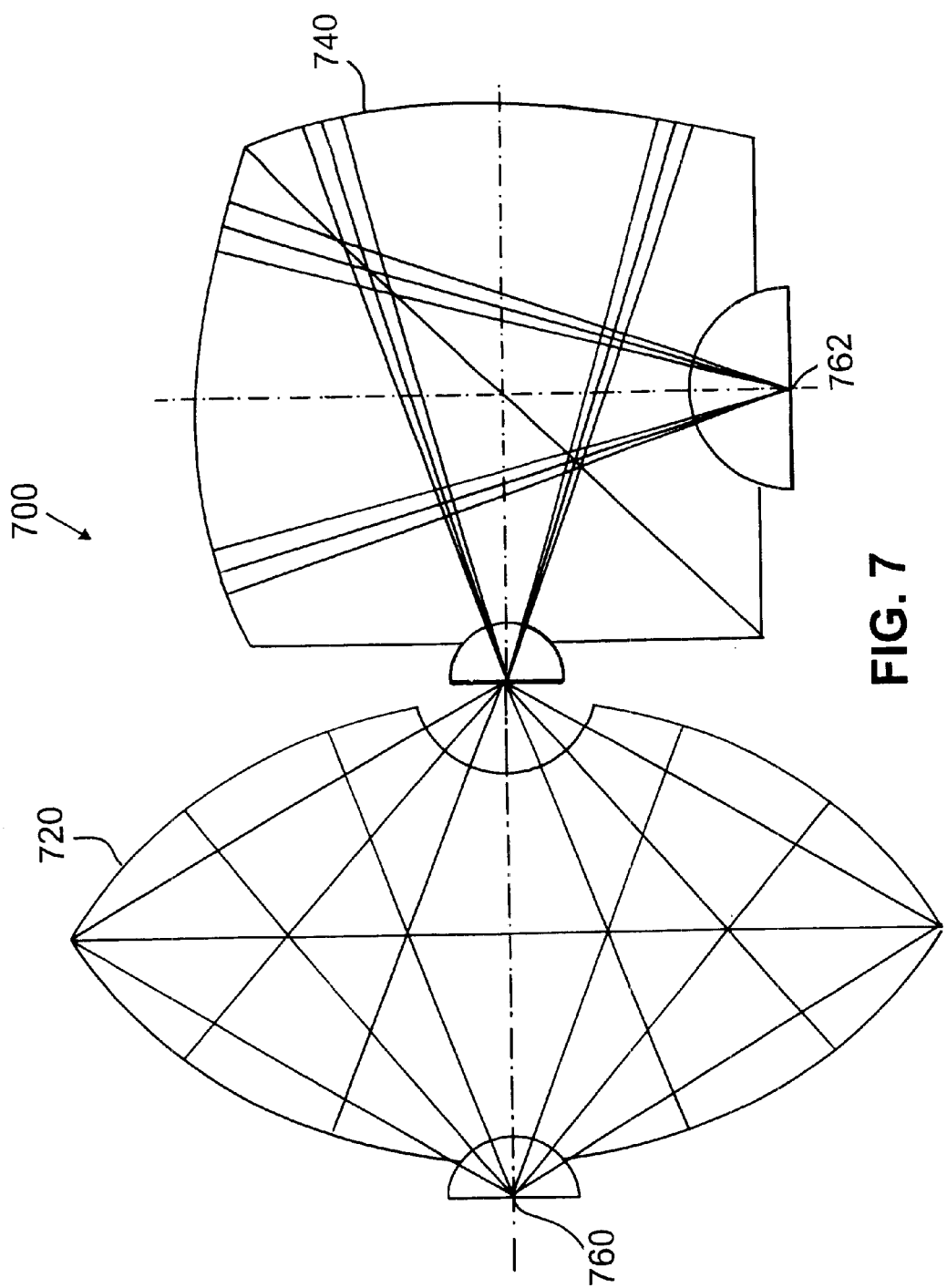
FIG. 7 is a schematic drawing of a composite catadioptric imaging system that includes imaging systems similar to those in FIGS. 5 and 6.
Figure 8:
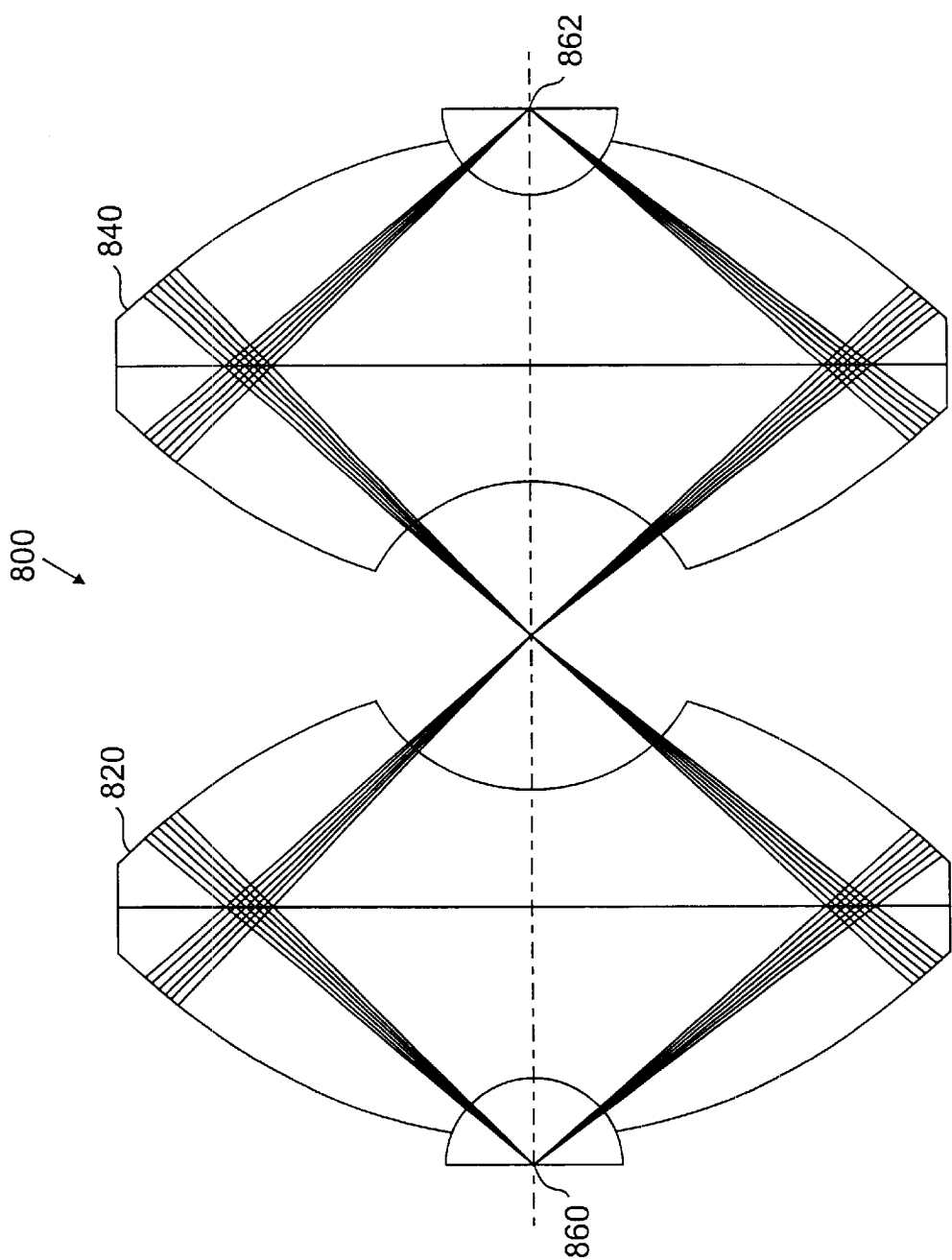
FIG. 8 is a schematic drawing of a composite catadioptric imaging system that inlcudes imaging systems similar to those in FIG. 5.
Figure 9:
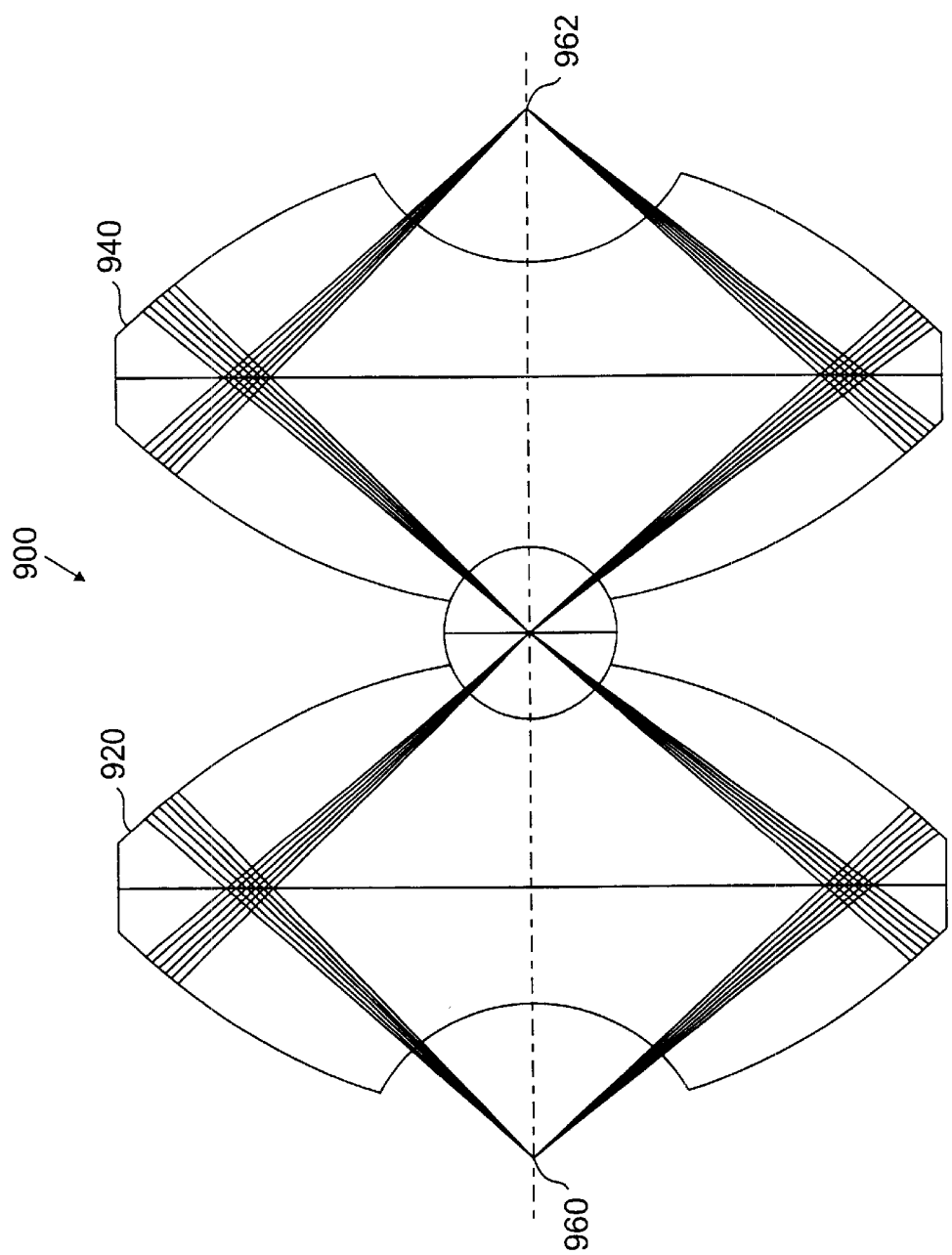
FIG. 9 is a schematic drawing of a composite catadioptric imaging system that includes imaging systems similar to those in FIG. 5.

Any of the imaging systems described above can be chained together to form composite imaging systems. Referring to FIG. 7, a composite catadioptric imaging system 700 includes an image point 762, object point 760, and catadioptric imaging subsystems 720 and 740. The image point of subsystem 720 is set to coincide the object point of subsystem 740. The catadioptric imaging subsystem 720 is similar to catadioptric imaging system 500 and the catadioptric imaging subsystem 740 is similar to the catadioptric imaging system 600. Additional embodiments include any other permutation. For example, referring to FIG. 8, a composite catadioptric imaging system 800 includes an image point 862, object point 860, and catadioptric imaging subsystems 820 and 840. Both imaging subsystems are similar to imaging system 500. Referring to FIG. 9, a composite catadioptric imaging system 900 includes of an image point 962, object point 960, and catadioptric imaging subsystems 920 and 940. Both imaging subsystems are similar to imaging system 500 wherein the analogous element 580 of the first subsystem is identical to element 520 of the second system. The magnification of imaging system 900 is one independent of the index of refraction of element 580 of the first subsystem. In addition, both the image point 962 and object point 960 are both accessible. This may be useful, for example, to allow a sample stage to access the object point 960 or to allow optical detectors access to image point 962. Other embodiments include permutations with more than two imaging systems (100 to 900) chained together.

A number of embodiments of the invention have been described. Nevertheless, it will be understood that various modifications may be made without departing from the spirit and scope of the invention. Accordingly, other embodiments are within the scope of the following claims.

What is claimed is:

1. An imaging system for imaging an object point to an image point, the system comprising:
   a beam splitter positioned to receive light rays from the object point and separate each ray into a transmitted portion and a reflected portion, the transmitted portions defining a first set of rays and the reflected portions defining a second set of rays; and
   a reflecting surface positioned to receive one of the sets of rays from the beam splitter and focus that set of rays towards the image point via the beam splitter,
   wherein the reflecting surface is positioned to receive the first set of rays and reflect the first set of rays back to the beam splitter,
   wherein the beam splitter is positioned to reflect at least a portion of each ray received from the reflecting surface to the image point, and
   wherein the reflecting surface is substantially concentric with the object point.

2. An imaging system for imaging an object point to an image point, the system comprising:
   a beam splitter positioned to receive light rays from the object point and separate each ray into a transmitted portion and a reflected portion, the transmitted portions defining a first set of rays and the reflected portions defining a second set of rays; and
   a reflecting surface positioned to receive one of the sets of rays from the beam splitter and focus that set of rays towards the image point via the beam splitter,
   wherein the reflecting surface is positioned to receive the second set of rays and reflect the second set of rays back to the beam splitter,
   wherein the beam splitter is positioned to transmit at least a portion of each ray received from the reflecting surface to the image point, and wherein the reflecting surface is substantially concentric with the image point.

3. An imaging system for imaging an object point to an image point, the system comprising:

a beam splitter positioned to receive light rays from the object point and separate each ray into a transmitted portion and a reflected portion, the transmitted portions defining a first set of rays and the reflected portions defining a second set of rays; and a first optic having an internal surface defining the reflecting surface, the reflecting surface positioned to receive one of the sets of rays from the beam splitter and focus that set of rays towards the image point via the beam splitter wherein the first optic has a flat surface opposite the internal surface, and wherein the beam splitter is positioned adjacent the flat surface.

4. The imaging system of claim 3, wherein the internal surface of the first optic is curved.

5. The imaging system of claim 3, further comprising a plano-convex optic having a plano surface adjacent one of the object point and the image point and a convex surface contacting the first optic, wherein the interface between the plano-convex optic and the first optic defines a refracting surface.

6. The imaging system of claim 3, further comprising a second optic adjacent the first optic, wherein the beam splitter is positioned at an interface between the first and second reflective optics.

7. The imaging system of claim 3, further comprising a refracting surface positioned between the object point and the beam splitter to receive the light rays from the object point.

8. The imaging system of claim 3, further comprising a refracting surface positioned between the beam splitter and the image point to receive the light rays focused by the reflecting surface.

9. The imaging system of claim 3, wherein the reflecting surface is positioned to receive the first set of rays and reflect the first set of rays back to the beam splitter, wherein the beam splitter is positioned to reflect at least a portion of each ray received from the reflecting surface to the image point, wherein a center of the reflecting surface defines an object optical axis with the object point, and wherein the beam splitter is positioned at an acute angle to the object optical axis.

10. The imaging system of claim 9, wherein the acute angle is substantially equal to 45 degrees.

11. The imaging system of claim 3, wherein the reflecting surface is positioned to receive the second set of rays and reflect the second set of rays back to the beam splitter, wherein the beam splitter is positioned to transmit at least a portion of each ray received from the reflecting surface to the image point, wherein a center of the reflecting surface defines an image optical axis with the image point, and wherein the beam splitter is positioned at an acute angle to the image optical axis.

12. The imaging system of claim 11, wherein the acute angle is substantially equal to 45 degrees.

13. An imaging system for imaging an object point to an image point, the system comprising:

a beam splitter positioned to receive light rays from the object point and separate each ray into a transmitted portion and a reflected portion, the transmitted portions defining a first set of rays and the reflected portions defining a second set of rays;

a first optic having an internal surface defining a reflecting surface, the reflecting surface positioned to receive one of the sets of rays from the beam splitter and focus that set of rays towards the image point via the beam splitter;

a second optic adjacent the first optic, wherein the beam splitter is positioned at an interface between the first and second optics; and a plano-convex optic having a plano surface adjacent one of the object point and the image point and a convex surface contacting the second optic, wherein the interface between the plano-convex optic and the second optic defines a refracting surface.

14. The imaging system of claim 13, further comprising another plano-convex optic having a plano surface adjacent the other of the object point and the image point and a convex surface contacting the first optic, wherein the interface between the plano-convex optic and the first optic defines another refracting surface.

15. An imaging system for imaging an object point to an image point, the system comprising:

a beam splitter positioned to receive light rays from the object point and separate each ray into a transmitted portion and a reflected portion, the transmitted portions defining a first set of rays and the reflected portions defining a second set of rays;

a first optic having an internal surface defining a reflecting surface, the reflecting surface positioned to receive one of the sets of rays from the beam splitter and focus that set of rays towards the image point via the beam splitter; and a second optic adjacent the first optic, wherein the beam splitter is positioned at an interface between the first and second optics, and wherein the second optic is an optical flat.

16. An imaging system for imaging an object point to an image point, the system comprising:

a beam splitter positioned to receive light rays from the object point and separate each ray into a transmitted portion and a reflected portion, the transmitted portions defining a first set of rays and the reflected portions defining a second set of rays;

a first optic having an internal surface defining a reflecting surface, the reflecting surface positioned to receive one of the sets of rays from the beam splitter and focus that set of rays towards the image point via the beam splitter; and a second optic adjacent the first optic, wherein the beam splitter is positioned at an interface between the first and second optics, wherein the second optic has an internal surface defining a second reflecting surface, and wherein the first reflecting surface is positioned to receive the first set of rays and the second reflecting surface is positioned to received the second set of rays and focus them towards the image point via the beam splitter, and wherein the beam splitter is positioned to interferometrically recombine the first set of rays received from the first reflecting surface and the second set of rays received from the second reflecting surface.

17. An imaging system for imaging an object point to an image point, the system comprising:

a beam splitter positioned to receive light rays from the object point and separate each ray into a transmitted portion and a reflected portion, the transmitted portions defining a first set of rays and the reflected portions defining a second set of rays;

a first optic having an internal surface defining a reflecting surface, the reflecting surface positioned to receive one of the sets of rays from the beam splitter and focus that set of rays towards the image point via the beam splitter; and a second optic adjacent the first optic, wherein the beam splitter is positioned at an interface between the first and second optics, wherein the second optic has an internal surface defining a second reflecting surface, and wherein the first reflecting surface is positioned to receive the first set of rays and the second reflecting surface is positioned to received the second set of rays and focus them towards the image point via the beam splitter, and wherein the first reflecting surface is concentric with the object point and the second reflecting surface is concentric with the image point.

18. An imaging system for imaging an object point to an image point, the system comprising:

a beam splitter positioned to receive light rays from the object point and separate each ray into a transmitted portion and a reflected portion, the transmitted portions defining a first set of rays and the reflected portions defining a second set of rays;

a reflecting surface positioned to receive one of the sets of rays from the beam splitter and focus that set of rays towards the image point via the beam splitter; and a refracting surface positioned between the object point and the beam splitter to receive the light rays from the object point, wherein the refracting surface is substantially concentric with the object point.

19. An imaging system for imaging an object point to an image point, the system comprising:

a beam splitter positioned to receive light rays from the object point and separate each ray into a transmitted portion and a reflected portion, the transmitted portions defining a first set of rays and the reflected portions defining a second set of rays;

a reflecting surface positioned to receive one of the sets of rays from the beam splitter and focus that set of rays towards the image point via the beam splitter; and a refracting surface positioned between the beam splitter and the image point to receive the light rays focused by the reflecting surface, wherein the refracting surface is substantially concentric with the image point.

20. An imaging system for imaging an object point to an image point, the system comprising:

a beam splitter positioned to receive light rays from the object point and separate each ray into a transmitted portion and a reflected portion, the transmitted portions defining a first set of rays and the reflected portions defining a second set of rays; and a reflecting surface positioned to receive one of the sets of rays from the beam splitter and focus that set of rays towards the image point via the beam splitter, wherein the reflecting surface is positioned to receive the first set of rays and reflect the first set of rays back to the beam splitter, wherein the beam splitter is positioned to reflect at least a portion of each ray received from the reflecting surface to the image point, and wherein a center of the reflecting surface defines an object optical axis with the object point, and wherein the beam splitter is positioned substantially perpendicular to the object optical axis.

21. An imaging system for imaging an object point to an image point, the system comprising:

a beam splitter positioned to receive light rays from the object point and separate each ray into a transmitted portion and a reflected portion, the transmitted portions defining a first set of rays and the reflected portions defining a second set of rays; and a reflecting surface positioned to receive one of the sets of rays from the beam splitter and focus that set of rays towards the image point via the beam splitter, wherein the reflecting surface is positioned to receive the second set of rays and reflect the second set of rays back to the beam splitter, wherein the beam splitter is positioned to transmit at least a portion of each ray received from the reflecting surface to the image point, and wherein a center of the reflecting surface defines an image optical axis with the image point, and wherein the beam splitter is positioned substantially perpendicular to the image optical axis.

22. An imaging system comprising:

a first imaging system for imaging an object point to a first image point, the first imaging system comprising a first beam splitter positioned to receive light rays from the object point and separate each ray into a transmitted portion and a reflected portion, the transmitted portions defining a first set of rays and the reflected portions defining a second set of rays, and a first reflecting surface positioned to receive one of the sets of rays from the first beam splitter and focus that set of rays towards the first image point via the first beam splitter; and a second imaging system for imaging the first image point to a second image point, the second imaging system comprising a second beam splitter positioned to receive light rays from the first image point and separate each ray into a transmitted portion and a reflected portion, wherein the transmitted portions define a first set of rays and the reflected portions define a second set of rays, and a second reflecting surface positioned to receive one of the sets of rays from the second beam splitter and focus that set of rays towards the second image point via the second beam splitter.

* * * * *

UNITED STATES PATENT AND TRADEMARK OFFICE
CERTIFICATE OF CORRECTION

PATENT NO. : 6,552,852 B2  
DATED : April 22, 2003  
INVENTOR(S) : Henry A. Hill It is certified that error appears in the above-identified patent and that said Letters Patent is hereby corrected as shown below:

Column 2,  
Line 38, replace "piano" with -- plano --  
Line 51, insert -- be -- between "may" and "substantially"  
Lines 57 and 62, replace "piano" with -- plano --

Column 3,  
Line 3, replace "received" with -- receive --

Column 12,  
Lines 7 and 10, replace "piano" with -- plano --  
Line 54, replace "received" with -- receive --

Column 13,  
Line 13, replace "received" with -- receive --

Signed and Sealed this

Seventh Day of October, 2003

JAMES E. ROGAN  
*Director of the United States Patent and Trademark Office*